United States Patent
Sisk et al.

(10) Patent No.: US 11,619,429 B2
(45) Date of Patent: Apr. 4, 2023

(54) STEPPER MOTOR CONTROL VALVES FOR REFRIGERANT EXPANSION AND/OR SYSTEM CONTROLS

(71) Applicant: EMERSON ELECTRIC CO., St. Louis, MO (US)

(72) Inventors: Gregory E. Sisk, Bonne Terre, MO (US); Jeffrey N. Arensmeier, Fenton, MO (US); Christina M. Gilliam, St. Louis, MO (US); Joseph B. Sutton, III, St. Louis, MO (US); Thomas Stoneking, St. Clair, MO (US); Jacob Ridderhoff, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 218 days.

(21) Appl. No.: 17/220,237

(22) Filed: Apr. 1, 2021

(65) Prior Publication Data
US 2022/0316776 A1  Oct. 6, 2022

(51) Int. Cl.
*F25B 41/35* (2021.01)

(52) U.S. Cl.
CPC ...... *F25B 41/35* (2021.01); *F25B 2600/2513* (2013.01)

(58) Field of Classification Search
CPC ... F25B 41/35; F25B 2600/2513; Y02B 30/70
See application file for complete search history.

(56) References Cited

U.S. PATENT DOCUMENTS

| | | | | |
|---|---|---|---|---|
| 5,198,111 A | * | 3/1993 | Davis | B01D 29/6438 210/414 |
| 6,561,480 B1 | * | 5/2003 | Komiya | F25B 41/347 251/129.05 |
| 9,803,770 B2 | * | 10/2017 | Takahashi | F16K 3/0254 |
| 10,472,169 B1 | * | 11/2019 | Parker, Jr. | F16K 3/0281 |
| 2007/0090316 A1 | * | 4/2007 | Nalini | F16K 31/047 251/129.11 |
| 2011/0120161 A1 | * | 5/2011 | Hayashi | F25B 41/38 62/160 |

(Continued)

OTHER PUBLICATIONS

Sanhua DPF (T/S) Series Electronic Expansion Valve; Copyrght 2018; 3 pages.

(Continued)

*Primary Examiner* — Kun Kai Ma
(74) *Attorney, Agent, or Firm* — Harness, Dickey & Pierce, P.L.C.; Anthony Fussner (57) ABSTRACT

A valve includes a shaft having threads along at least a portion of a length of the shaft. A travel limit member (e.g., a coil spring, a washer, etc.) is disposed within one or more of the threads. The travel limit member may comprise a coil spring configured to be movable within the threads along the shaft when the shaft is rotated relative to the coil spring. The coil spring is configured to be operable for providing: a safety stall or hard stop for a fully open position of the valve when the coil spring is within the top thread and/or runs out of the threads after having traveled upwardly along the shaft within the threads; and a safety stall or hard stop for a fully closed position of the valve when the coil spring contacts a stop after having traveled downwardly along the shaft within the threads.

19 Claims, 9 Drawing Sheets

(56) References Cited

U.S. PATENT DOCUMENTS

| | | | | |
|---|---|---|---|---|
| 2014/0291562 | A1* | 10/2014 | Ooe | F25B 41/35 |
| | | | | 251/129.11 |
| 2015/0048266 | A1* | 2/2015 | Shen | F16K 31/04 |
| | | | | 251/69 |
| 2015/0276082 | A1* | 10/2015 | Harada | F25B 41/35 |
| | | | | 251/129.01 |
| 2016/0146366 | A1* | 5/2016 | Takahashi | F16K 3/00 |
| | | | | 251/129.15 |
| 2016/0290525 | A1* | 10/2016 | Hotta | B60H 1/00921 |
| 2016/0313037 | A1* | 10/2016 | Takahashi | H02P 8/30 |
| 2016/0341336 | A1* | 11/2016 | Harada | F25B 41/35 |
| 2017/0284242 | A1* | 10/2017 | Isoda | F16K 17/06 |
| 2018/0202569 | A1* | 7/2018 | Kawase | F16K 1/44 |
| 2018/0304451 | A1* | 10/2018 | Seamons | B25B 27/24 |
| 2019/0368618 | A1* | 12/2019 | Wei | F16K 1/52 |

OTHER PUBLICATIONS

Electronic Expansion Valve; Products Digest Catalog; Oct. 2010; 3 pages.

EX3 Electronic Expansion Valve; EX Valves & Controls; Emerson Climate Technologies; 2004; 3 pages.

DX3 Stepper Motor Driven Electronic Expansion Valve; Data Sheet; Jan. 25, 2019; 14 pages.

Electronic expansion valves—EXV; CAREL; https://www.carel.com/electronics-expansion-valve; printed Apr. 1, 2021; 7 pages.

Thermostatic Expansion Valves with Selective Thermostatic Charges; SPORLAN; https://sporlanonline.com/literature/10/10-10.pdf; Apr. 2011; 40 pages.

\* cited by examiner

STEPPER MOTOR CONTROL VALVES FOR REFRIGERANT EXPANSION AND/OR SYSTEM CONTROLS

FIELD

The present disclosure generally relates to stepper motor control valves for refrigerant expansion and/or system controls.

BACKGROUND

This section provides background information related to the present disclosure which is not necessarily prior art.

Expansion valves are commonly used devices for controlling the flow of liquid refrigerant into an evaporator. For example, a stepper-motor driven expansion valve may be used for precisely controlling refrigerant flow as the stepper motor is operable to provide discrete segments of angular motion or rotation in response to an electronically generated signal.

DRAWINGS

The drawings described herein are for illustrative purposes only of selected embodiments and not all possible implementations, and are not intended to limit the scope of the present disclosure.

Corresponding reference numerals may indicate corresponding (though not necessarily identical) features throughout the several views of the drawings.

DETAILED DESCRIPTION

Example embodiments will now be described more fully with reference to the accompanying drawings.

Figure 1:
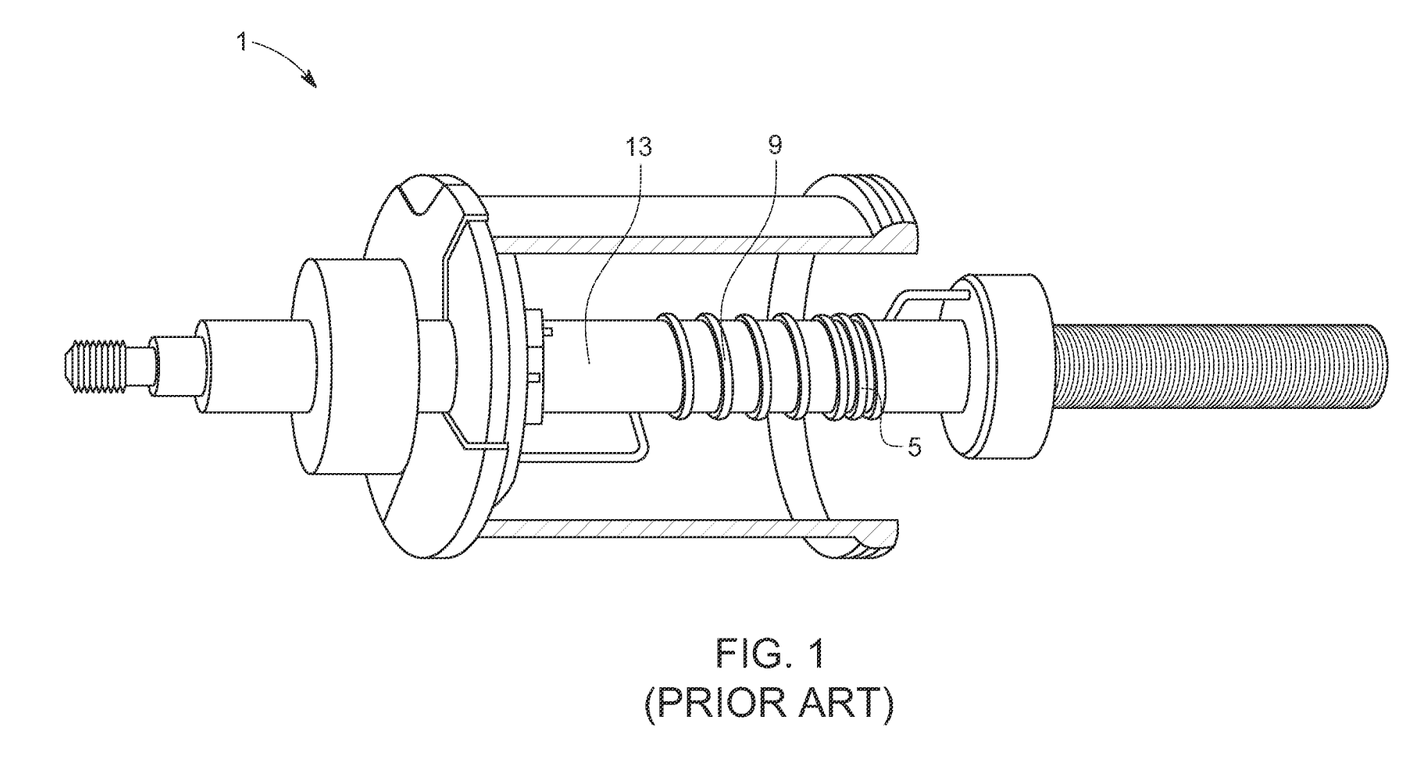
FIGS. 1 and 2 illustrate a conventional stepper motor expansion valve having a pin/port configuration and an intricate set of intertwined springs to accomplish a safety stall or hard stop for the valve's full open and closed positions.
Figure 2:
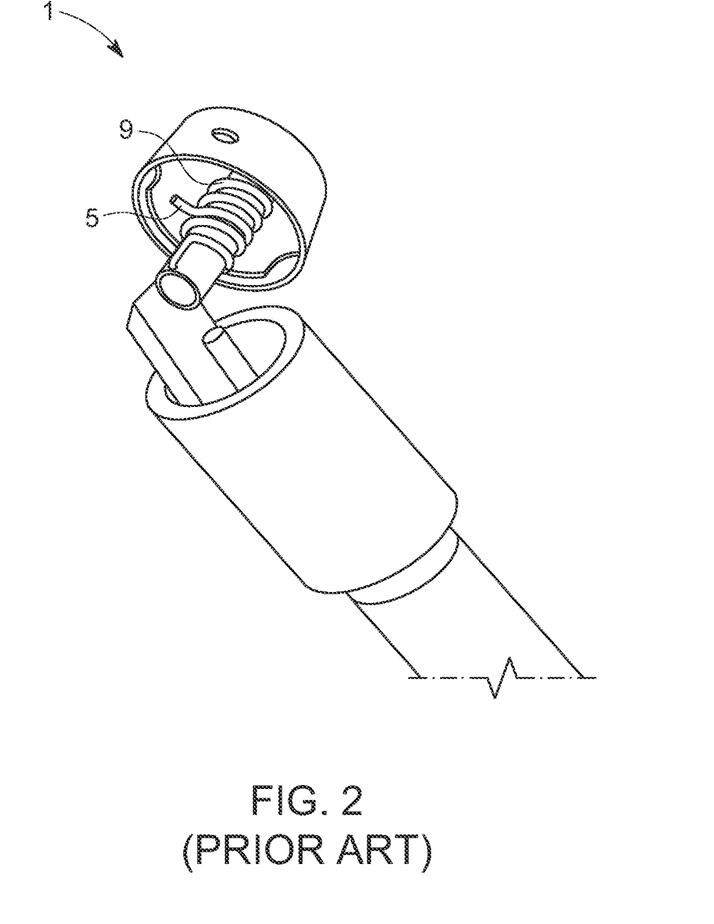

As noted above, a stepper-motor driven expansion valve may be used for precisely controlling refrigerant flow. Conventional stepper motor expansion valves utilize an intricate set of intertwined springs to accomplish a safety 'stall' or hard stop for the fully open and fully closed positions. For example, FIGS. 1 and 2 illustrate a conventional stepper motor expansion valve 1 having a pin/port configuration and an intricate set of intertwined springs 5 and 9 to accomplish a safety stall or hard stop for the valve's full open and closed positions.

A stall is designed in the valve 1 to ensure the stepper motor does not overdrive the valve 1 causing failure modes at either of the fully open position or fully closed position. This also allows the stepper motor control valve to find a "known home" position, which is traditionally fully closed.

As the valve's rotor steps/spins, the stop spring 5 will travel up and down the shaft 13 inside of intertwined spring 9. The stop spring 5 will continue to travel up or down the shaft 13 until the stop spring 5 reaches a top or bottom, respectively, at which the stop spring 5 catches on end points of the intertwined spring 9. The top and bottom positions of the stop spring 5 coincides with the valve's fully open and closed positions. Accordingly, a safety stall or hard stop are provided for the valve's fully open and fully closed positions by the stop spring 5 catching on the end points of the intertwined spring 9.

It is common to use the set of intertwined springs 5 and 9 for providing a safety stall or hard stop are provided for the valve's fully open and fully closed positions. But as recognized herein, the set of intertwined springs is associated with added extra costs, added parts, extra assembly time, and complication to install.

After recognizing drawbacks associated with the use of intertwined springs, exemplary embodiments were developed and/or are disclosed herein of stepper motor control valves that include a travel limit member (e.g., a coil spring, a wave or lock washer, etc.) disposed within and movable along threads along a shaft of the stepper motor control valve. As disclosed herein, the travel limit member may comprise a coil spring (e.g., a single 1-coil spring, etc.) configured to travel up and down the shaft's threads depending on the rotational direction of the shaft to provide a safety stall or hard stop for the valve's fully open and closed positions.

As the spring nears the top of travel within the shaft's threads, the spring's legs or end portions will stall by running out of threads due to the hard top plug with the shaft bearing. In which case, the spring provides a safety stall or hard stop for the valve's fully open position.

As the spring nears the bottom of travel within the shaft threads, the spring will stall when the spring's leg or end portion contacts a bottom stop or upwardly protruding portion of the rotor. In which case, the spring provides a safety stall or hard stop for the valve's fully closed position.

By eliminating the need to use intricate and costly intertwined springs for providing a safety stall or hard stop for the valve's fully open and closed positions, exemplary embodiments may provide one or more of advantages as compared to conventional stepper motor expansion valves, such as less components and quicker and easier assembly.

Figure 3:
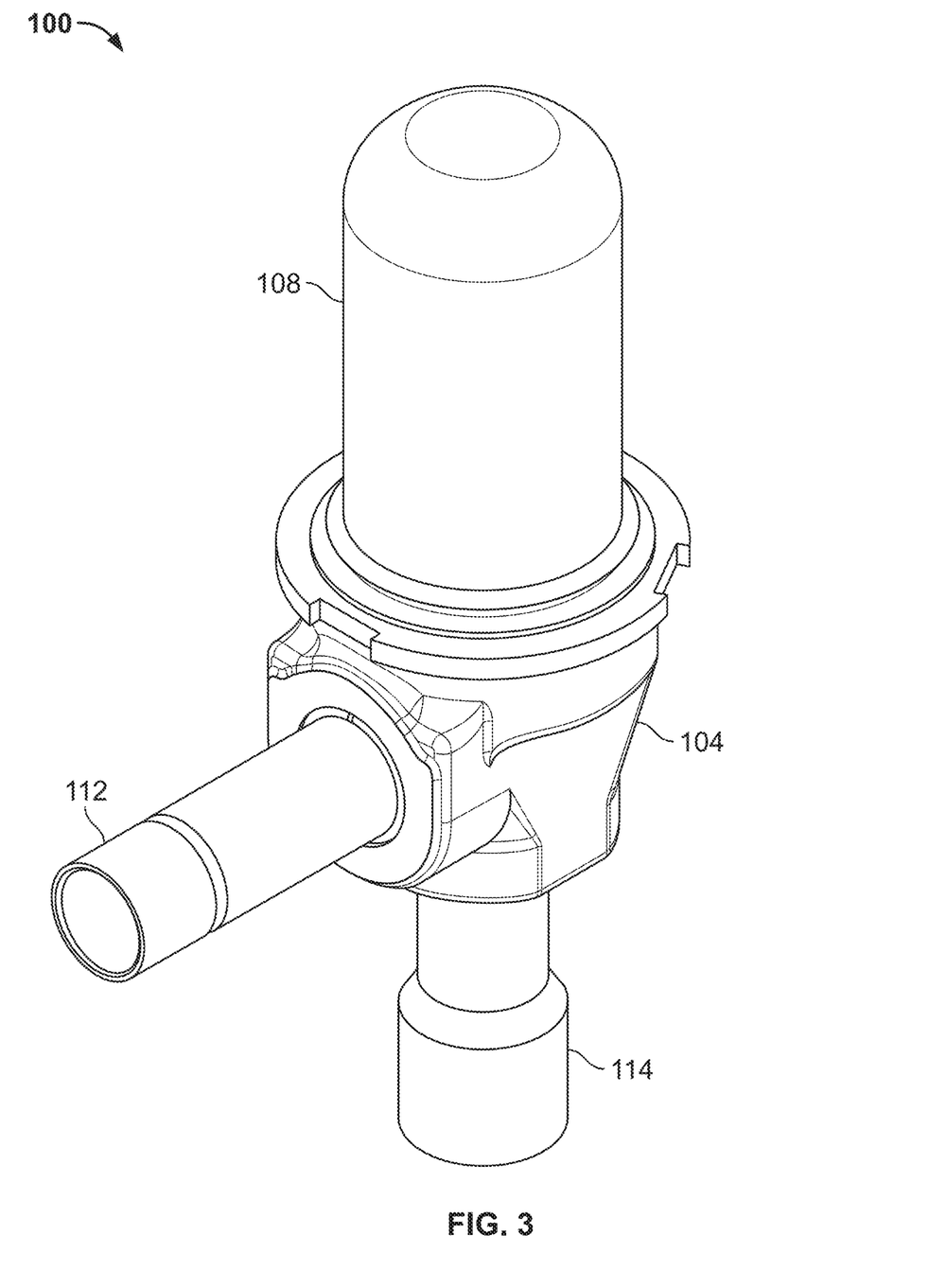
FIG. 3 is a perspective view of a stepper motor control valve according to an exemplary embodiment.

FIGS. 3-6 illustrate an exemplary embodiment of a stepper-motor drive electronic expansion valve 100 (broadly, a valve) embodying one or more aspects of the present disclosure. As shown in FIG. 3, the valve 100 includes a valve body 104 including an upper portion 108, and fluid conduits 112, 114.

A stator of a stepper motor may be configured to be positioned over the upper portion 108 of the valve 100. By way of example only, the stepper motor may comprise a high resolution, linear stepper motor in conjunction with a built in rotor. The stepper motor may comprise a 12 VDC uni-polar stepper motor with 500 steps or more. But aspects of the present disclosure should not be limited to any specific stepper motor as other stepper motors may be used in other exemplary embodiments. In addition, aspects of the present disclosure may also be used in other valve types such as a butterfly valve, needle valve, plug valve, gate valve that uses a shaft to turn the valve on/off, or other metering type valve, etc.

Figure 4:
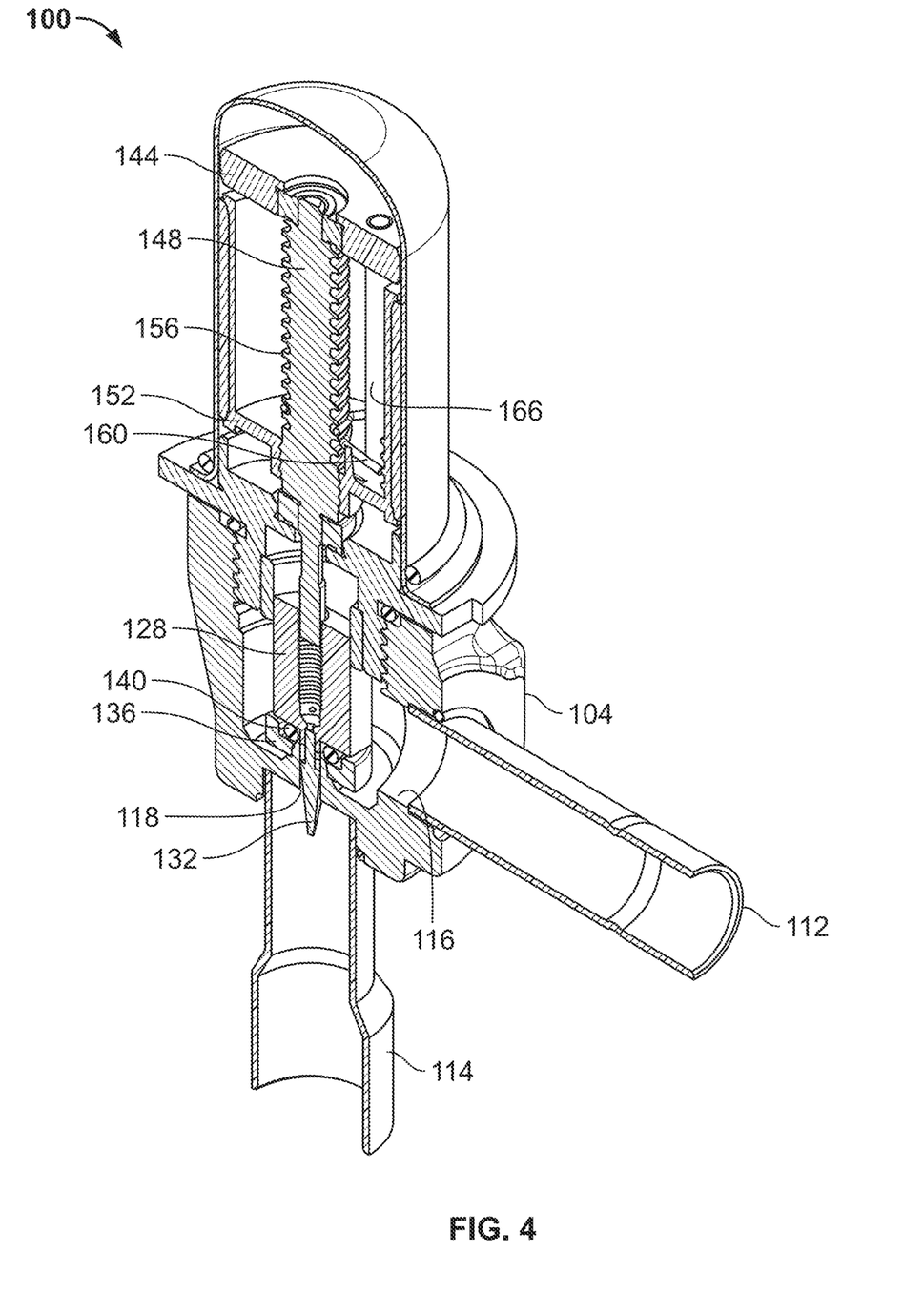
FIG. 4 is a cross-sectional view of the stepper motor control valve shown in FIG. 3, and illustrating a shaft having threads along a length of the shaft and a single 1-coil spring disposed within and movable along the threads of the shaft.

As shown in FIG. 4, the fluid conduits 112, 114 are respectively connected to and/or in fluid communication with valve openings or ports 116, 118. Accordingly, the fluid conduits 112, 114 and ports 116, 118 define a passage that allows refrigerant (broadly, fluid) to pass through the valve 100. The ports 116, 118 may be integrally defined (e.g., machined into, etc.) by the valve body 104.

The valve 100 includes a movable valve member 128 slidably disposed within the valve body 104. The movable valve member 128 is movable by a stepper motor relative to (towards and away from) the valve port 118.

A pin 132 and valve seat 136 are coupled to the movable valve member 128. By way of example, the pin 132 may comprise a metal tapered metering pin. The valve seat 136 may comprise a collar (e.g., a polytetrafluoroethylene (PTFE) collar, etc.) disposed on (e.g., press fit onto, etc.) the pin 132.

The valve seat 136 is configured (e.g., sized, shaped, positioned, etc.) to close off the valve 100 when the movable valve member 128 (and valve seat 136 coupled thereto) is moved by the stepper motor towards the valve port 118 such that the valve seat 136 seats against and seals the valve port 118. When the movable valve member 128 is moved away from the valve port 118 by the stepper motor, the valve seat 136 is also moved away from and is spaced apart from the valve port 118 thereby opening the valve 100. Accordingly, the valve seat 136 is moveable between a closed position in which the valve seat 136 is against and seals the valve port 118 and inhibits fluid flow through the valve port 118, and an open position in which the valve seat 136 is spaced apart from the valve port 118 and permits fluid flow through the valve port.

Figure 6:
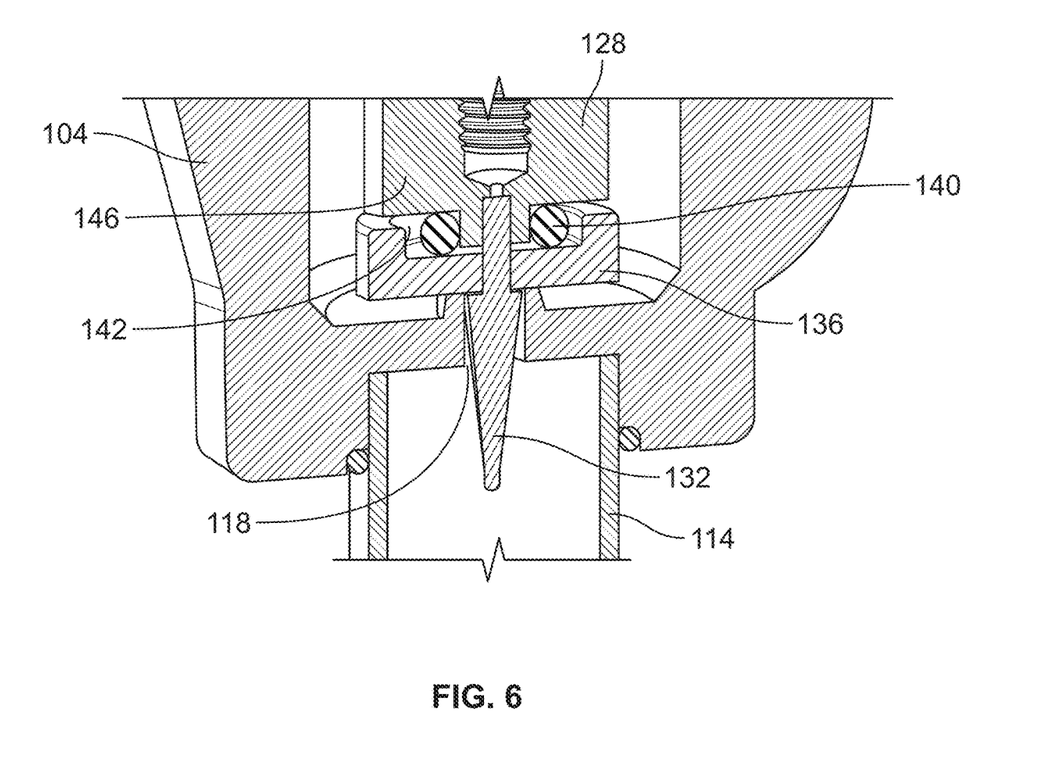
FIG. 6 is a cross-sectional view of the stepper motor control valve shown in FIG. 3, and illustrating a sealing member (e.g., refrigerant compatible O-ring, etc.) disposed within a cavity behind a valve seat (e.g., PTFE collar, etc.).

As shown in FIGS. 4 and 6, a sealing member 140 (e.g., a refrigerant compatible O-ring, etc.) may be disposed within a cavity 142 behind the valve seat 136. The cavity 142 may be cooperatively defined generally between an upper portion of the valve seat 136 and a lower end portion 146 of the movable valve member 128. The sealing member 140 may be configured to allow both impact dampening and gimbal. The impact dampening may help improve or extend the service life of the valve 100 by absorbing the stepper drive down blow. The gimbal may allow multi-angles of flexibility to ensure a tighter seal off of valve port 118 by the valve seat 136. By way of example, the sealing member 140 may be made from Neoprene chloroprene synthetic elastomer, Viton fluoropolymer elastomer, Kalrez perfluoroelastomer, silicones, or any other elastomeric material compatible with refrigerants.

Figure 5:
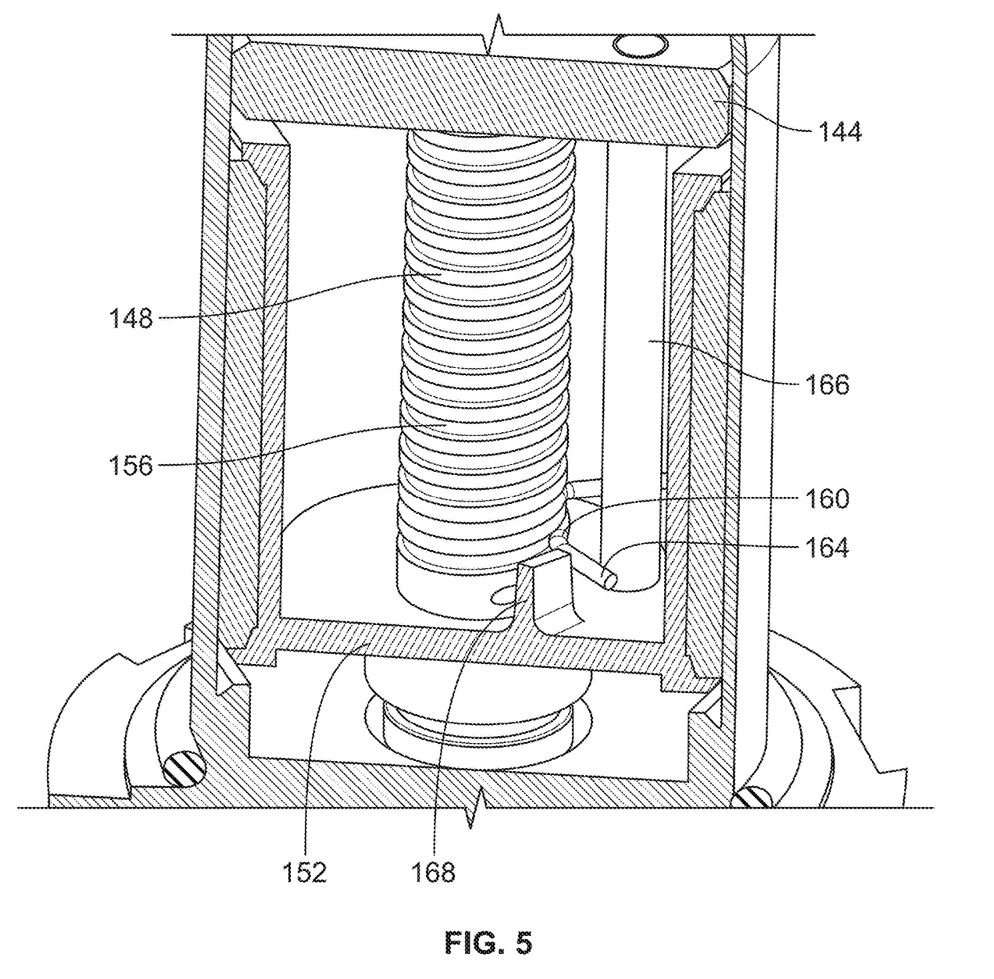
FIG. 5 further illustrates the single 1-coil spring disposed within and movable along threads of the shaft of the stepper motor control valve shown in FIG. 4.

As shown in FIGS. 4 and 5, a plug 144 with a shaft bearing is rotatably coupled to an upper end portion of a shaft 148. A rotor 152 is coupled to a lower opposite end portion of the shaft 148 for common rotation with the shaft 148.

The shaft 148 includes grooves, ridges, or threads 156 along at least a portion of the length of the shaft 148. In exemplary embodiments, the threads 156 comprise a worm gear thread or an ACME thread along the length of the shaft 148. For example, the shaft 148 may include threads including a threadform, which has a 29° thread angle with a thread height half of the pitch, a flat apex or crux, and a flat valley or root. Advantageously, the shape of the ACME thread may allow for easier machining and faster cutting than a square thread. In alternative embodiments, the shaft may be provided with other suitable threads, such as a helical thread for drive purposes, ball screw threading, etc.

In exemplary embodiments, the threads 156 may be machined into the shaft 148. Because the shaft 148 may already undergo significant machining for purposes of the stepper motor, machining the threads 156 into the shaft 148 may therefore be within a current cycle time of the shaft 148. Alternative embodiments may include threads that are provided along the shaft in other ways.

Figures 7, 8, 9:
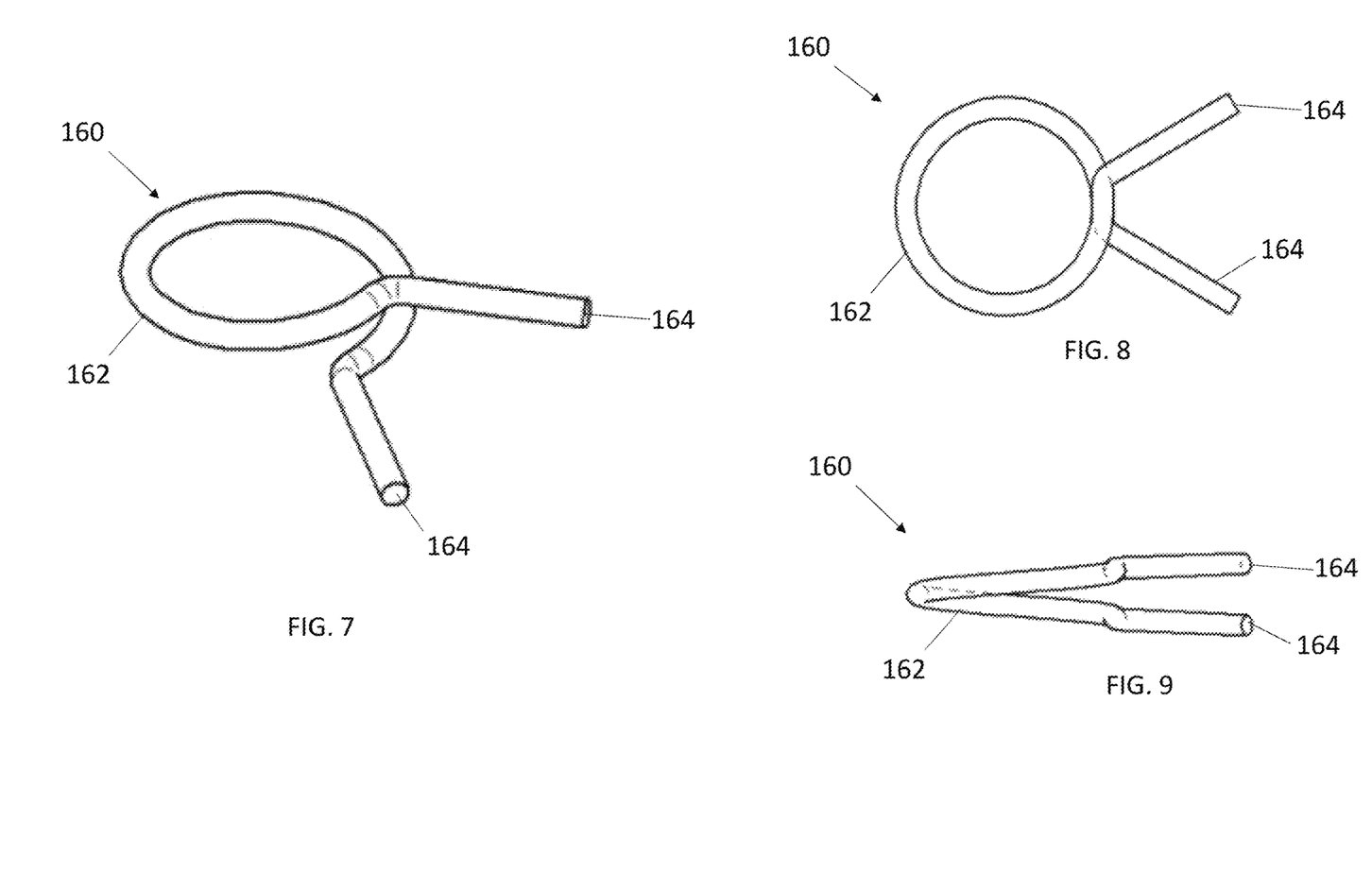
FIGS. 7-9 are perspective, top, and side views of a single 1-coil spring that may be disposed within and movable along threads of the shaft of the stepper motor control valve shown in FIG. 4 according to an exemplary embodiment.
Figure 10:
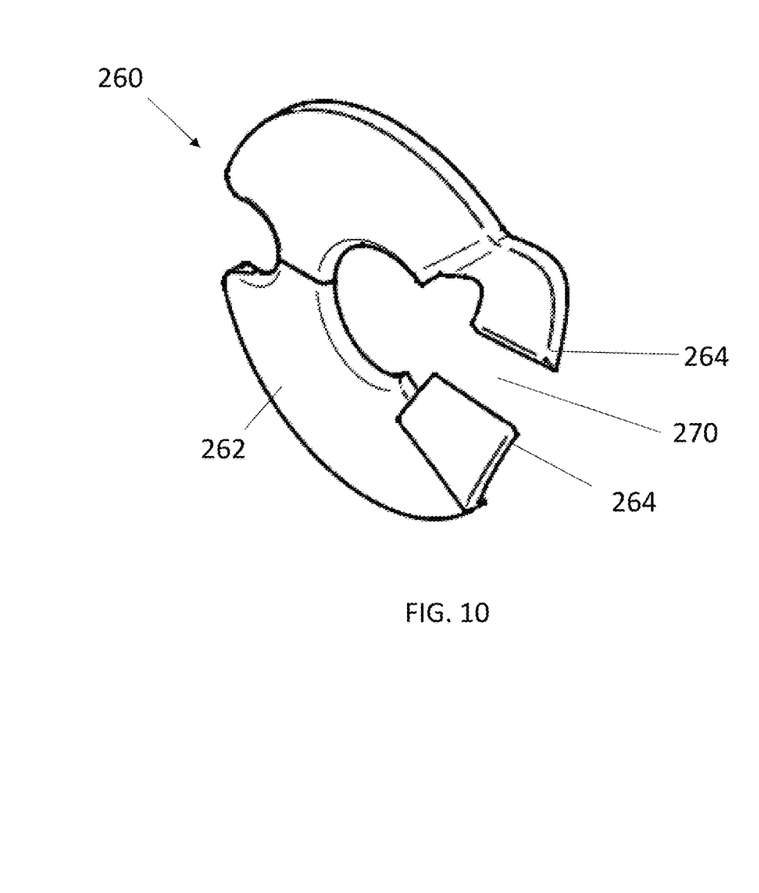
FIGS. 10-13 are perspective, front, side, and top views of a washer that may be disposed within and movable along threads of the shaft of the stepper motor control valve shown in FIG. 4 according to alternative exemplary embodiment.
Figure 11:
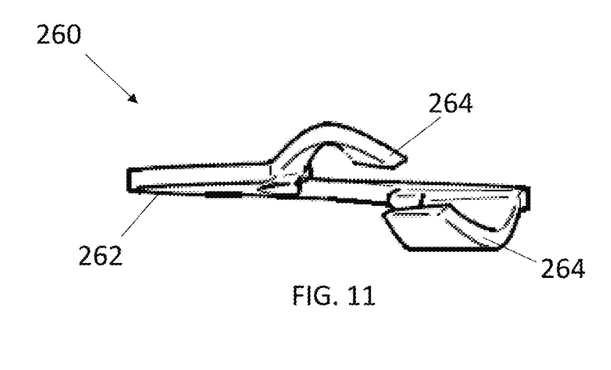
Figure 12:
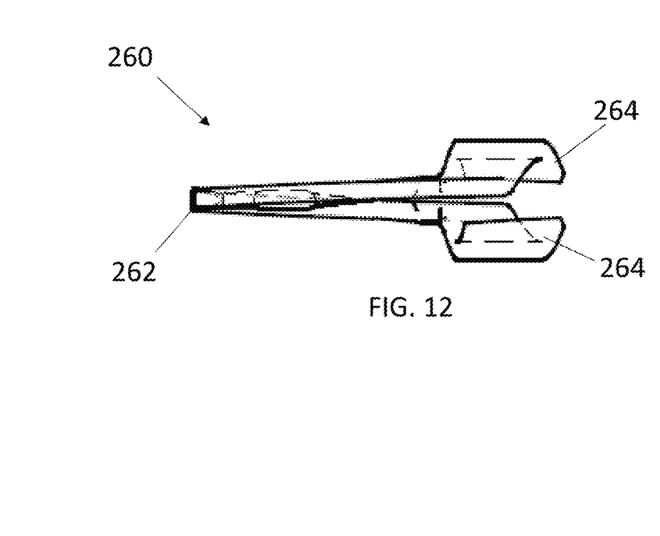
Figure 13:
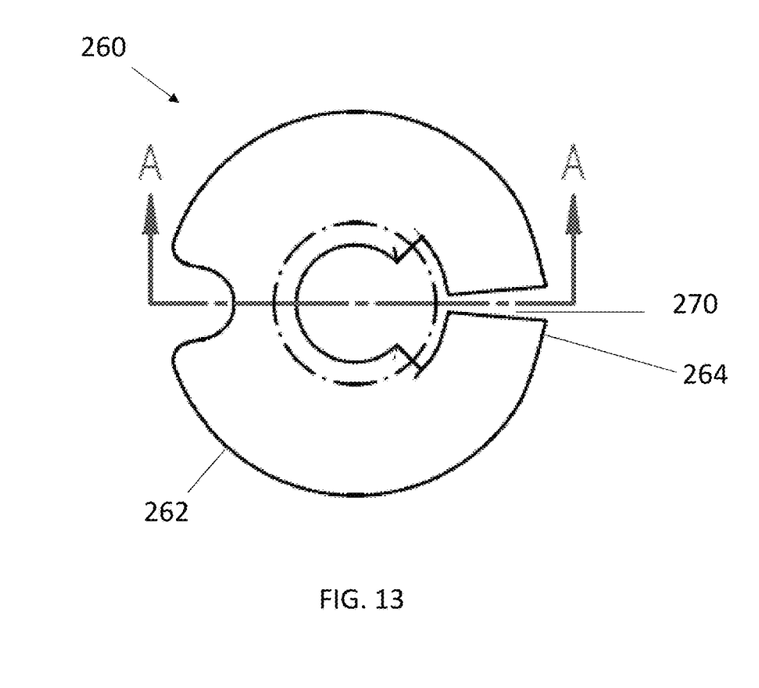
Figure 14:
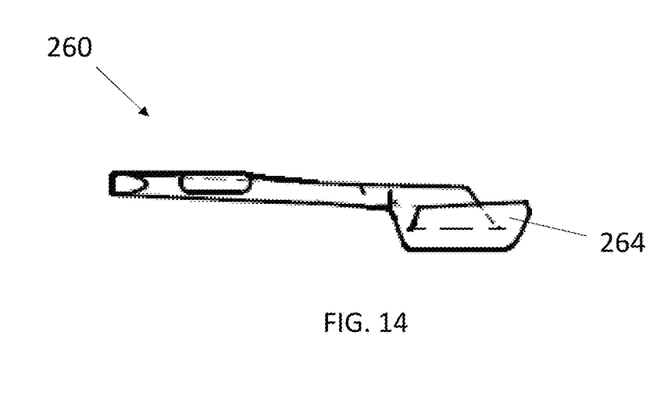
FIG. 14 is a cross-sectional view of the washer shown in FIGS. 10-13 taken along a plane A-A in FIG. 13.

As shown in FIG. 5, a coil spring 160 (broadly, a travel limit member) is disposed within and movable along the threads 156 of the shaft 148. FIGS. 7-9 illustrate an exemplary coil spring 160 that may be used as the travel limit member according to an exemplary embodiment. As shown in FIGS. 7-9, the coil spring 160 including a single coil 162 and legs or end portions 164. The single coil 162 of the coil spring 160 is configured to be disposed within and movable along the thread grooves of the shaft 148.

The coil spring 160 is configured to travel up and down the shaft's threads 156 as the rotor 152 steps/spins to provide a safety stall or hard stop for the valve's fully open and closed positions. Depending on the rotational direction of the rotor 152, the spring 160 will travel up or down the threads 156 along the shaft 148 as the rotor 152 steps/spins.

As the spring 160 nears the top of travel within a top thread of the threads 156, the spring's legs or end portions 164 will stall (e.g., upon contact with dowel rod, pin, or stop 166, etc.) by running out of threads 156 due to the hard top plug 144 with the shaft bearing. In which case, the spring 160 provides a safety stall or hard stop for the valve's fully open position.

As the spring 160 nears the bottom of travel within the threads 156, the spring 160 will stall when at least one of the spring's legs or end portions 164 contacts a bottom stop or upwardly protruding portion 168 (e.g., integrally molded portion, etc.) of the rotor 152. In which case, the spring 160 provides a safety stall or hard stop for the valve's fully closed position.

In this illustrated embodiment, the spring 160 is a single 1-coil spring as shown in FIGS. 7-9. Alternative embodiments may include differently configured travel limit members (e.g., a wave or lock washer with a slit, etc.) and/or differently configured springs, such as having one or more springs with one or more coils, etc.

For example, FIGS. 10-14 illustrate a travel limit member or disk 260 comprising a flat stamped wave or lock washer according to an alternative embodiment. The washer 260 includes a portion 262 defining an opening (e.g., a generally circular opening, etc.) and configured to be disposed within and movable along thread grooves of the shaft 148 (FIG. 5). The washer 260 also includes legs or end portions 264 and a slit 270, which may be configured to have a tapered gap corresponding to a worm gear groove or ACME thread. In alternative embodiments, the washer 260 comprises a plastic or molded part instead of stamped lock washer.

With reference to FIG. 5, the portion 262 of the washer 260 may be disposed within and movable along the threads 156 of the shaft 148 instead of the coil spring 160. In which case, the washer 260 is configured to travel up and down the shaft's threads 156 as the rotor 152 steps/spins to provide a safety stall or hard stop for the valve's fully open and closed positions. Depending on the rotational direction of the rotor 152, the washer 260 will travel up or down the threads 156 along the shaft 148 as the rotor 152 steps/spins.

As the washer 260 nears the top of travel within a top thread of the threads 156, the washer's legs or end portions 264 will stall (e.g., upon contact with a dowel rod, pin, or stop 166, etc.) by running out of threads 156 due to the hard top plug 144 with the shaft bearing. In which case, the washer 260 provides a safety stall or hard stop for the valve's fully open position.

As the washer 260 nears the bottom of travel within the threads 156, the washer 260 will stall when at least one of the washer's legs or end portions 164 contacts a bottom stop or upwardly protruding portion 168 (e.g., integrally molded portion, etc.) of the rotor 152. In which case, the washer 260 provides a safety stall or hard stop for the valve's fully closed position.

Exemplary embodiments of valves disclosed herein may be used in a wide range of systems, such as refrigerated cases (e.g., supermarket cases, etc.), refrigerated walk-ins, HVAC systems including large commercial scale HVAC systems or refrigeration systems, electric bus air conditioning and heat pump systems, commercial heat pump systems, modular air-conditioning systems, process chillers, etc. Exemplary embodiments of valves disclosed herein may also be used with any medium temp or low temp refrigeration such as convenience store, ice machine, grocery store, pharmaceutical production or storage, commercial air conditioning, residential air conditioning, humidification and de-humidification systems, marijuana dryers, etc. Accordingly, aspects of the present disclosure should not be limited to use with any one particular type of system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one embodiment comprises or includes such feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve comprising:
   a shaft having threads along at least a portion of a length of the shaft, the threads including a top thread; and
   a travel limit member disposed within one or more of the threads, the travel limit member configured to be movable within the threads along the shaft when the shaft is rotated relative to the travel limit member, the travel limit member configured to be operable for providing:
      a safety stall or hard stop for a fully open position of the valve when the travel limit member is within the top thread and/or runs out of the threads after having traveled upwardly along the shaft within the threads; and
      a safety stall or hard stop for a fully closed position of the valve when the travel limit member contacts a stop after having traveled downwardly along the shaft within the threads;
   wherein the travel limit member comprises a coil spring disposed within one or more of the threads, the coil spring configured to be movable within the threads along the shaft when the shaft is rotated relative to the coil spring, the coil spring configured to be operable for providing:
      the safety stall or hard stop for the fully open position of the valve when the coil spring is within the top thread and/or runs out of the threads after having traveled upwardly along the shaft within the threads; and
      the safety stall or hard stop for the fully closed position of the valve when the coil spring contacts a stop after having traveled downwardly along the shaft within the threads;
   wherein the coil spring consists of a single coil spring; and
   wherein the single coil spring has only one coil.

2. The valve of claim 1, wherein the threads comprise a worm gear thread along the at least a portion of the length of the shaft.

3. The valve of claim 1, wherein the threads comprise an ACME thread along the at least a portion of the length of the shaft.

4. The valve of claim 1, wherein the threads are machined into the shaft.

5. The valve of claim 1, wherein the valve includes:
   a valve port;
   a stepper motor; and
   a movable valve member movable relative to the valve port by the stepper motor between a closed position in which fluid flow through the valve port is inhibited and an open position in which fluid flow through the valve port is permitted.

6. The valve of claim 5, wherein:
   the valve includes a valve seat coupled to the movable valve member; and
   the valve seat is configured to seat against and seal the valve port when the movable valve member is in the closed position and to be spaced apart from the valve port when the movable valve member is in the open position.

7. The valve of claim 6, wherein:
   the valve includes a pin coupled to the movable valve member; and
   the valve seat comprises a collar disposed on the pin.

8. The valve of claim 7, wherein:
   the pin comprises a tapered metering pin; and
   the collar comprises a polytetrafluoroethylene (PTFE) collar disposed on the tapered metering pin.

9. A stepper motor driven electronic expansion valve comprising the valve of claim 1.

10. A valve comprising:
    a shaft having threads along at least a portion of a length of the shaft, the threads including a top thread; and
    a travel limit member disposed within one or more of the threads, the travel limit member configured to be movable within the threads along the shaft when the shaft is rotated relative to the travel limit member, the travel limit member configured to be operable for providing:
       a safety stall or hard stop for a fully open position of the valve when the travel limit member is within the top thread and/or runs out of the threads after having traveled upwardly along the shaft within the threads; and
       a safety stall or hard stop for a fully closed position of the valve when the travel limit member contacts a stop after having traveled downwardly along the shaft within the threads
    wherein the threads include:
       a threadform having a 29° thread angle with a thread height half of a pitch;
       a flat apex or crux; and
       a flat valley or root.

11. The valve of claim 10, wherein the travel limit member comprises a coil spring disposed within one or more of the threads, the coil spring configured to be movable within the threads along the shaft when the shaft is rotated relative to the coil spring, the coil spring configured to be operable for providing:
    the safety stall or hard stop for the fully open position of the valve when the coil spring is within the top thread and/or runs out of the threads after having traveled upwardly along the shaft within the threads; and
    the safety stall or hard stop for the fully closed position of the valve when the coil spring contacts the stop after having traveled downwardly along the shaft within the threads.

12. The valve of claim 11, wherein the coil spring consists of a single coil spring.

13. The valve of claim 12, wherein the single coil spring has only one coil.

14. A valve comprising:
a shaft having threads along at least a portion of a length of the shaft, the threads including a top thread; and
a travel limit member disposed within one or more of the threads, the travel limit member configured to be movable within the threads along the shaft when the shaft is rotated relative to the travel limit member, the travel limit member configured to be operable for providing:
a safety stall or hard stop for a fully open position of the valve when the travel limit member is within the top thread and/or runs out of the threads after having traveled upwardly along the shaft within the threads; and
a safety stall or hard stop for a fully closed position of the valve when the travel limit member contacts a stop after having traveled downwardly along the shaft within the threads;
wherein the travel limit member comprises a washer disposed within one or more of the threads, the washer configured to be movable within the threads along the shaft when the shaft is rotated relative to the washer, the washer configured to be operable for providing:
the safety stall or hard stop for the fully open position of the valve when the washer is within the top thread and/or runs out of the threads after having traveled upwardly along the shaft within the threads; and
the safety stall or hard stop for the fully closed position of the valve when the washer contacts a stop after having traveled downwardly along the shaft within the threads.

15. A valve comprising:
a shaft having threads along at least a portion of a length of the shaft, the threads including a top thread; and
a travel limit member disposed within one or more of the threads, the travel limit member configured to be movable within the threads along the shaft when the shaft is rotated relative to the travel limit member, the travel limit member configured to be operable for providing:
a safety stall or hard stop for a fully open position of the valve when the travel limit member is within the top thread and/or runs out of the threads after having traveled upwardly along the shaft within the threads; and
a safety stall or hard stop for a fully closed position of the valve when the travel limit member contacts a stop after having traveled downwardly along the shaft within the threads;
wherein the valve includes:
a valve port;
a stepper motor; and
a movable valve member movable relative to the valve port by the stepper motor between a closed position in which fluid flow through the valve port is inhibited and an open position in which fluid flow through the valve port is permitted;
wherein:
the valve includes a rotor coupled to a lower end portion of the shaft for common rotation with the shaft, and a shaft bearing to which an upper end portion of the shaft is rotatably coupled;
the travel limit member consists of a single coil spring having only one coil;
the stop comprises an integral upwardly protruding portion of the rotor; and
the coil spring includes end portions and is configured such that:
the safety stall or hard stop for the fully open position of the valve is provided when the single coil spring reaches the top thread and at least one of the end portions of the single coil spring contacts a dowel rod; and
the safety stall or hard stop for the fully closed position of the valve is provided when at least one of the end portions of the single coil spring contacts the integral upwardly protruding portion of the rotor.

16. A valve comprising:
a shaft having threads along at least a portion of a length of the shaft, the threads including a top thread; and
a travel limit member disposed within one or more of the threads, the travel limit member configured to be movable within the threads along the shaft when the shaft is rotated relative to the travel limit member, the travel limit member configured to be operable for providing:
a safety stall or hard stop for a fully open position of the valve when the travel limit member is within the top thread and/or runs out of the threads after having traveled upwardly along the shaft within the threads; and
a safety stall or hard stop for a fully closed position of the valve when the travel limit member contacts a stop after having traveled downwardly along the shaft within the threads;
wherein the valve includes:
a valve port;
a stepper motor; and
a movable valve member movable relative to the valve port by the stepper motor between a closed position in which fluid flow through the valve port is inhibited and an open position in which fluid flow through the valve port is permitted;
wherein:
the valve includes a rotor coupled to a lower end portion of the shaft for common rotation with the shaft, and a shaft bearing to which an upper end portion of the shaft is rotatably coupled;
the travel limit member comprises a washer;
the stop comprises an integral upwardly protruding portion of the rotor; and
the washer includes end portions separated by a slit and is configured such that:
the safety stall or hard stop for the fully open position of the valve is provided when the washer reaches the top thread and at least one of the end portions of the washer contacts a dowel rod; and
the safety stall or hard stop for the fully closed position of the valve is provided when at least one of the end portions of the washer contacts the integral upwardly protruding portion of the rotor.

17. A stepper motor driven electronic expansion valve comprising:
a valve port;
a stepper motor including a shaft having threads along at least a portion of a length of the shaft, the threads including a top thread;
a movable valve member movable relative to the valve port by the stepper motor between a fully closed position in which fluid flow through the valve port is inhibited and a fully open position in which fluid flow through the valve port is permitted;
a single coil spring having only one coil within one or more of the threads, the single coil spring configured to be movable within the threads along the shaft when the shaft is rotated relative to the single coil spring, the single coil spring configured to be operable for providing:
- a safety stall or hard stop for the fully open position when the single coil spring is within the top thread and/or runs out of the threads after having traveled upwardly along the shaft within the threads; and
- a safety stall or hard stop for the fully closed position when the single coil spring contacts a stop after having traveled downwardly along the shaft within the threads.

18. The valve of claim 17, wherein:
the threads comprise a worm gear thread along the at least a portion of the length of the shaft; and/or
the threads comprise an ACME threads along the at least a portion of the length of the shaft; and/or
the threads include a flat apex or crux, a flat valley or root, and a threadform having a 29° thread angle with a thread height half of the pitch.

19. The valve of claim 17, wherein:
the valve includes a rotor coupled to a lower end portion of the shaft for common rotation with the shaft, and a shaft bearing to which an upper end portion of the shaft is rotatably coupled;
the stop comprises an integral upwardly protruding portion of the rotor; and
the single coil spring includes end portions and is configured such that:
- the safety stall or hard stop for the fully open position is provided when the single coil spring reaches the top thread and at least one of the end portions of the single coil spring contacts a dowel rod; and
- the safety stall or hard stop for the fully closed position is provided when at least one of the end portions of the single coil spring contacts the integral upwardly protruding portion of the rotor.

* * * * *